(12) United States Patent
Cayaban (10) Patent No.: US 9,236,070 B1
(45) Date of Patent: Jan. 12, 2016

(54) DUAL OPPOSING CANTILEVER PADS OF SUSPENSION FLEXURE

(71) Applicant: NITTO DENKO CORPORATION, Ibaraki-shi, Osaka (JP)

(72) Inventor: Alex Enriquez Cayaban, Fremont, CA (US)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 14/710,838

(22) Filed: May 13, 2015

Related U.S. Application Data (60) Provisional application No. 62/038,760, filed on Aug. 18, 2014.

(51) Int. Cl.
*G11B 5/48* (2006.01)

(52) U.S. Cl.
CPC .................................. *G11B 5/4826* (2013.01)

(58) Field of Classification Search
CPC ......... G11B 5/147; G11B 5/48; G11B 5/4826
USPC ................................................ 360/245–245.9
See application file for complete search history.

(56) References Cited

U.S. PATENT DOCUMENTS

| | | | |
|---|---|---|---|
| 5,815,347 A * | 9/1998 | Pattanaik | 360/234.5 |
| 5,862,010 A * | 1/1999 | Simmons et al. | 360/99.15 |
| 6,518,521 B1 * | 2/2003 | Marek et al. | 200/16 D |
| 6,965,499 B1 * | 11/2005 | Zhang et al. | 360/234.8 |
| 7,781,679 B1 * | 8/2010 | Schreiber et al. | 174/254 |
| 2004/0181932 A1 * | 9/2004 | Yao et al. | 29/603.03 |
| 2004/0257708 A1 * | 12/2004 | Erpelding | 360/245.9 |
| 2013/0342936 A1 * | 12/2013 | Nishiyama et al. | 360/244 |
| 2014/0160599 A1 * | 6/2014 | Higuchi et al. | 360/294.4 |
| 2014/0268427 A1 * | 9/2014 | Hogan et al. | 360/245.4 |

* cited by examiner

*Primary Examiner* — Allen T Cao
(74) *Attorney, Agent, or Firm* — Sughrue Mion, PLLC (57) ABSTRACT

A suspension flexure is provided. The suspension flexure includes a steel layer, a polyimide layer above the steel layer, and a copper layer on the polyimide layer comprising a plurality of dual opposing cantilevered copper pads.

12 Claims, 14 Drawing Sheets

Tongue and groove pad edge version

Fig. 8B

Fig. 11A
Small steel openings version

Fig. 11B
Steel Side Shown

DUAL OPPOSING CANTILEVER PADS OF SUSPENSION FLEXURE

BACKGROUND

1. Field

Apparatuses consistent with the exemplary embodiments relate to dual opposing cantilevers, and more specifically, to dual opposing cantilever pads for a hard disk drive (HDD) suspension flexure tail.

2. Description of the Related Art

Hard disk drives (HDD's) include suspension circuits which support the HDD in, for example, a computer. A suspension circuit includes a suspension flexure which is connected to a flex circuit. The suspension circuit provides an electrical connection between a flex circuit (such an actuator flex circuit) and the read-write head of the computer. The suspension circuit consists of a steel layer and one or more intricately patterned copper foil layers with insulating material (for example, polyimide) which separate the conductive layers (for example, the copper and steel layers) from each other.

An electrical connection between the conductive layers is possible using openings in the insulator. The read-write head (mounted on one end of the suspension circuit) flies above the spinning disk of a hard disk drive. The steel layer of the suspension circuit functions as a spring which allows the read-write head to hover above the spinning disk without crashing while the copper circuitry provides the electrical signal which is required for writing and reading data to and from the disk (i.e. converting electrical current to magnetic field for writing and converting magnetic field to electrical current for reading).

Figure 1A:
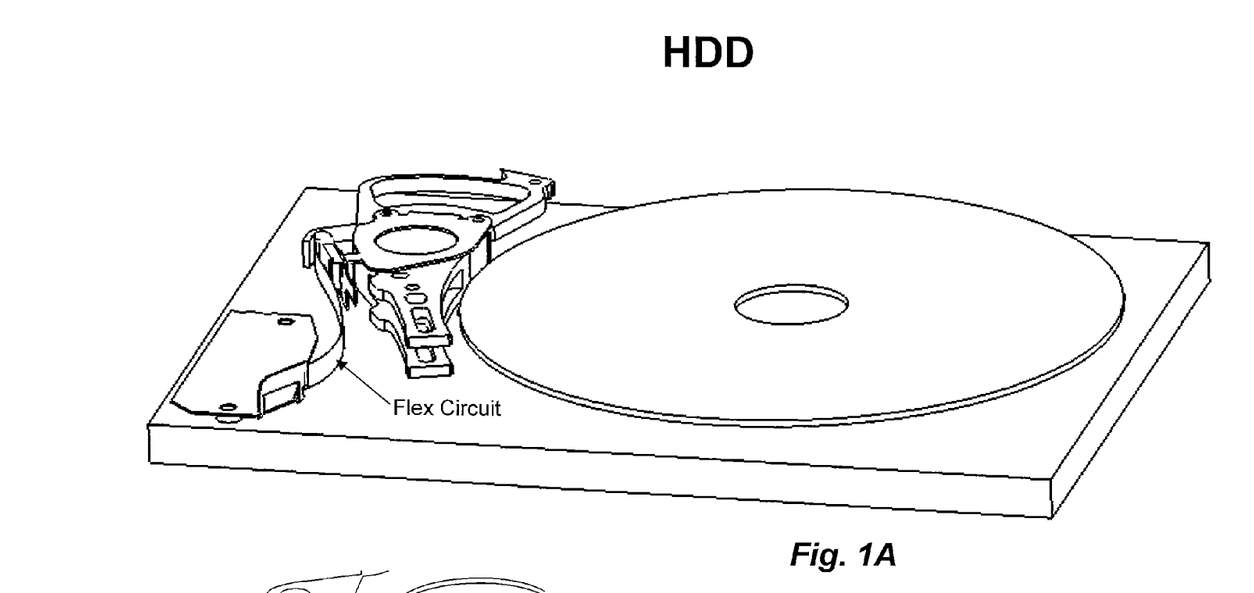
FIGS. 1A and 1B illustrate a hard disk drive (HDD)
Figure 1B:
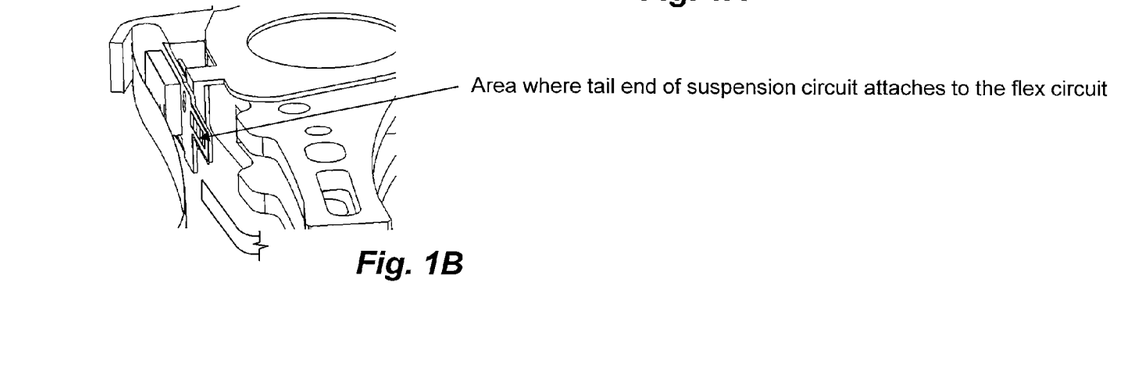
Figure 2:
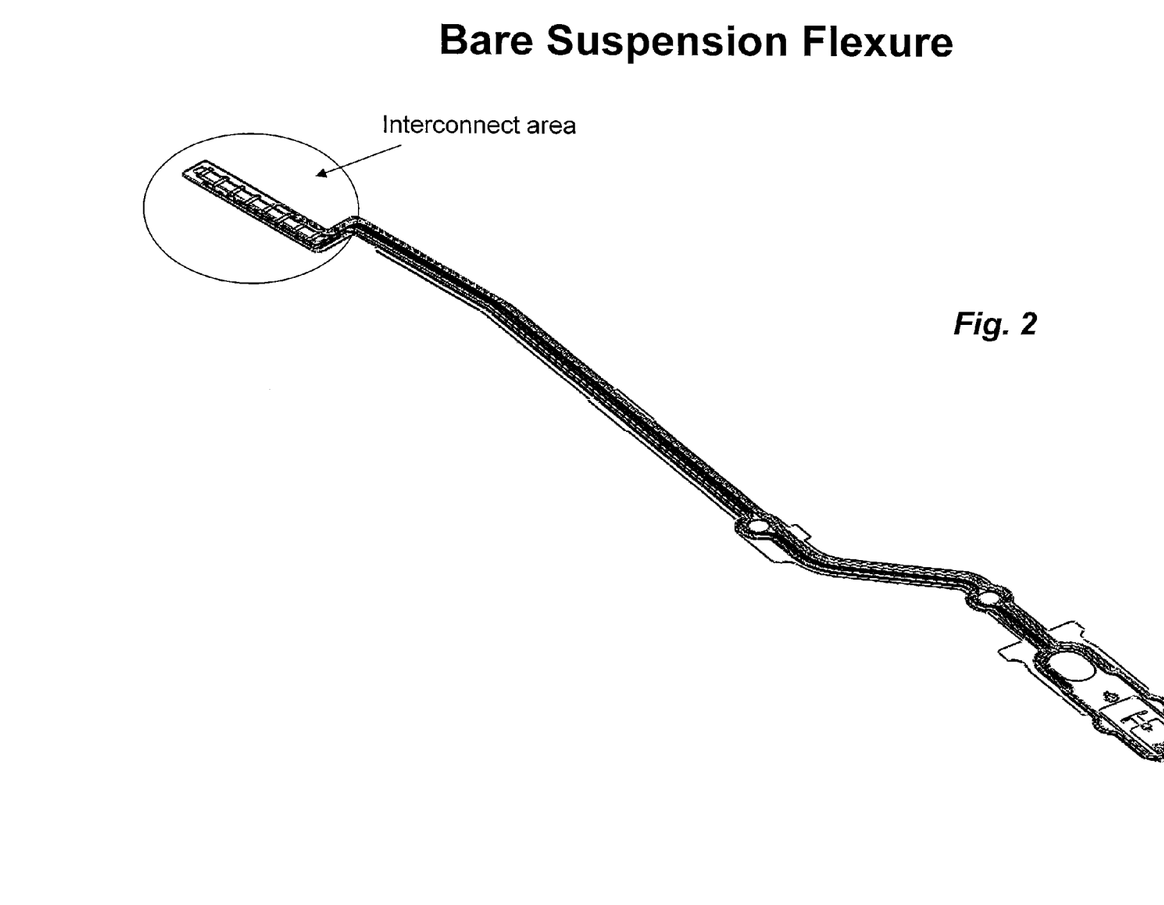
FIG. 2 illustrates a bare suspension flexure.
Figures 3A, 3B:
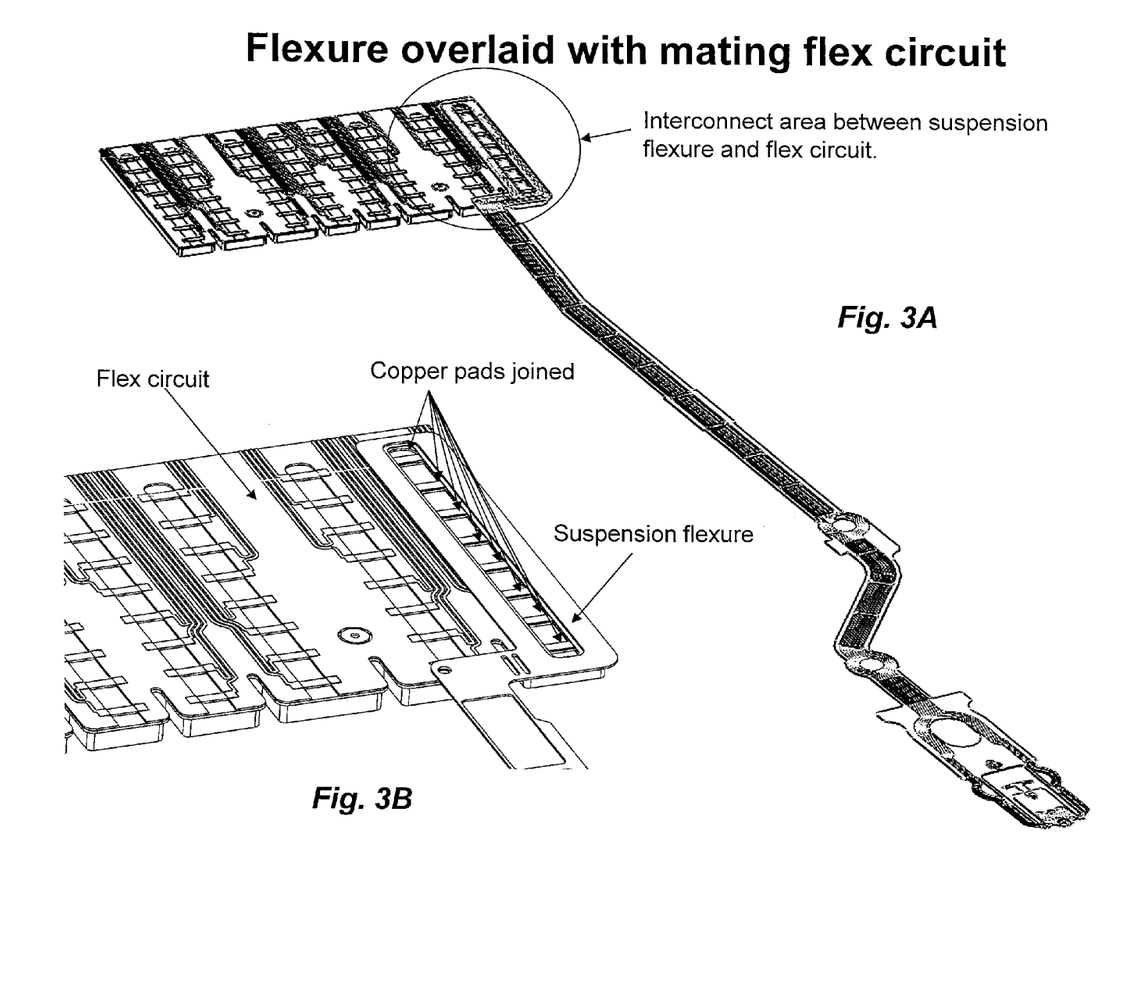
FIG. 3A illustrates a suspension flexure connected to a flex circuit.
FIG. 3B is a more detailed view of the flex circuit which is connected to the suspension flexure.
Figures 4A, 4B:
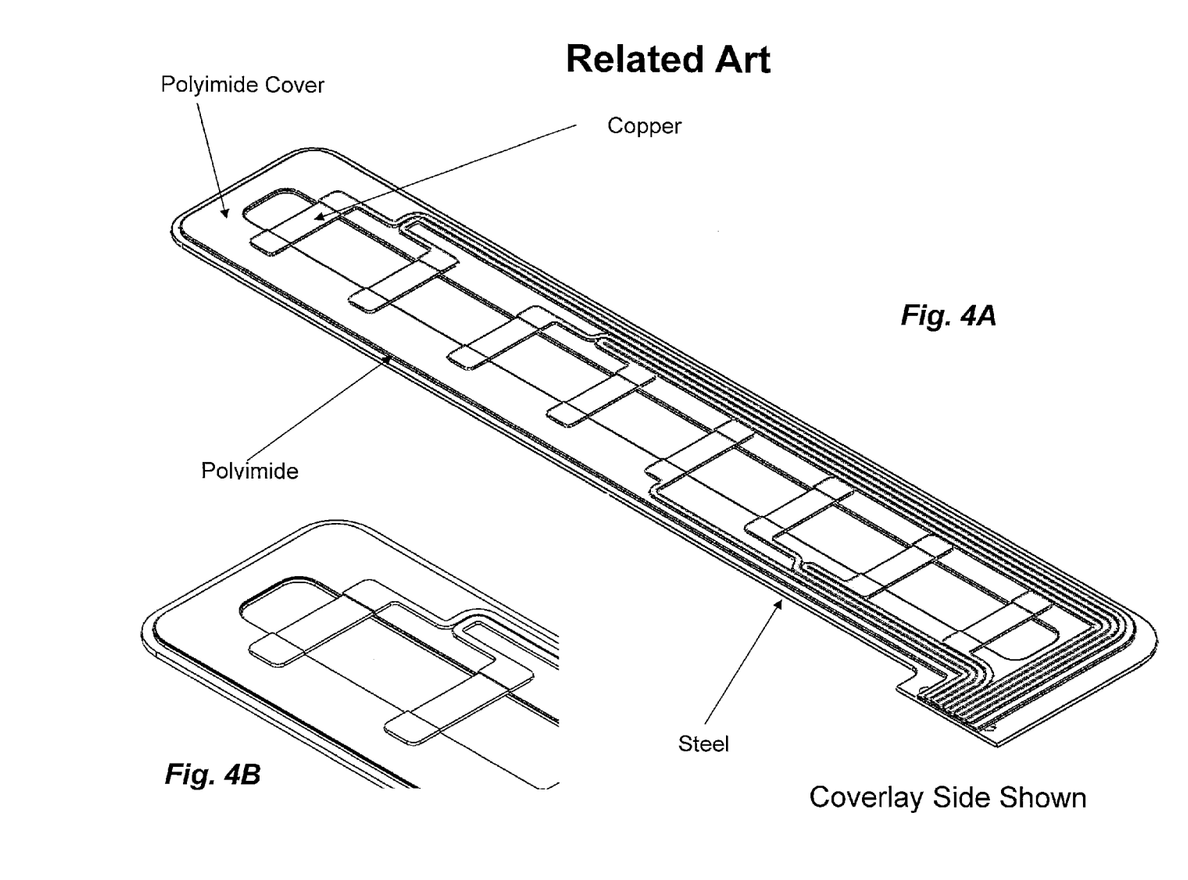
FIG. 4A illustrates a tail end of the suspension flexure.
FIG. 4B is a detailed view of a portion of the tail end of the suspension flexure.

FIGS. 1A and 1B illustrate a hard disk drive. A suspension circuit is inserted in the HDD as shown in the drawings. The mid tail of the suspension circuit is inserted, for example, in a groove. The head area of the flex circuit is shown in FIG. 3A and this would be connected to the tail end of the suspension circuit. FIG. 2 illustrates a bare suspension flexure used in a HDD. Such a suspension flexure is called a bare suspension flexure since it will need to be, for example, bent, folded or assembled to include additional parts. Further, the suspension flexure illustrated in FIG. 2 is flat, however, it can be formed, folded and assembled to additional parts prior to being connected with a flex circuit. FIG. 3A illustrates a suspension flexure which is connected to a flex circuit and FIG. 3B is a more detailed drawing illustrating the flex circuit which is connected to the suspension flexure. The flex circuit can also be called, for example, the mating actuator flex circuit. FIGS. 4A and 4B are drawings illustrating the tail end of a suspension flexure.

Figure 5:
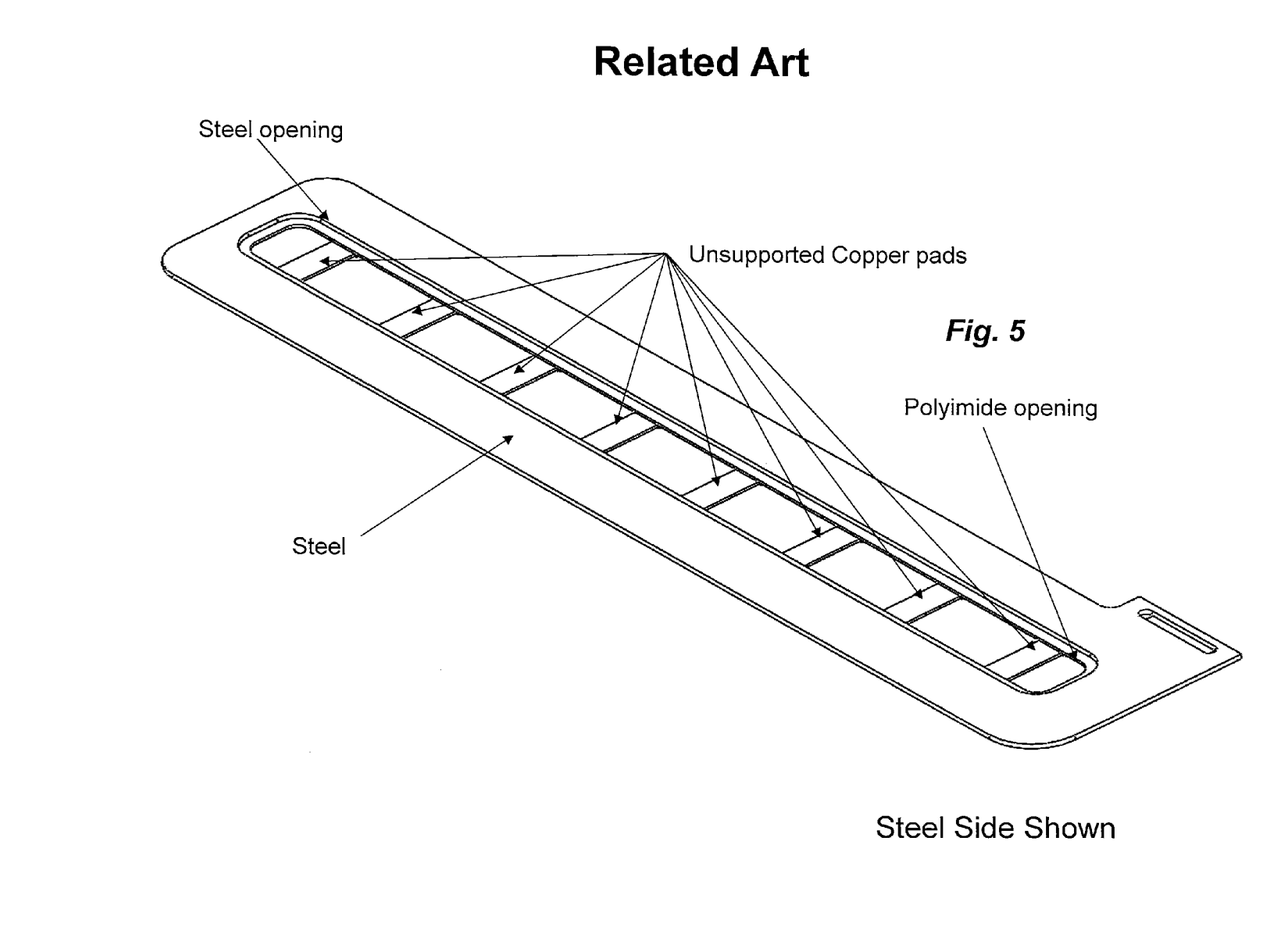
FIG. 5 is a steel side view of the suspension flexure of FIG. 4A.

As shown in FIGS. 4A and 4B, the tail end of the suspension flexure is made of a layer of steel, then a polyimide layer which is placed over the steel layer, copper pads above the polyimide layer, and then a polyimide cover which is placed on the suspension flexure after the copper. FIG. 4B illustrates the copper which is placed on the suspension flexure in more detail. FIG. 5 illustrates a steel side view of the suspension flexure.

Copper pads are spaced throughout the suspension flexure in order to join the suspension flexure with a flex circuit. The tail pad of the suspension flexure provides the electrical connection between the tail end of the suspension circuit to the head pads of the actuator flex circuit. However, as shown in FIG. 4A, since long, unsupported copper tail pads are used in some suspension flexures, the copper pads may be prone to damage (deformation and/or breakage) during ultrasonic washing, and prone to breakage during manufacturing and handling. Also, some current copper pads designs have a rather large size (i.e. long and wide), and therefore, only a few copper pads can be included in the suspension flexure. Further, this can result in a bulky suspension flexure which requires a lot of space. Suspension circuits with added functionality which will require additional pads, and a new and narrower, yet more robust pad design may be needed.

Also, currently, a different tail design is needed based on the different bonding methods which are used to connect the suspension flexure with the flex circuit. That is, tail pads are designed for a particular bonding method. For example, long, narrow unsupported copper pads are suitable for ultrasonic bonding, whereas copper pads supported with a polyimide base and a small volume of steel can be used for hot bar bonding. However, copper pads which are supported with a polyimide base and a small volume of steel which can be used for hot bar bonding are unsuitable for ultrasonic bonding because the polyimide may absorb the ultrasonic energy required for bonding. Similarly, very wide copper pads with a hole in the center can be used for solder jet bonding, but are unsuitable for hot bar bonding because the hole in the copper may cause the solder to wick and transfer onto the hot bar bonding tool which may then transfer onto undesired areas of other parts that use the same machine.

SUMMARY

An exemplary embodiment is directed to a suspension flexure including a steel layer, a polyimide layer above the steel layer, and a copper layer on the polyimide layer comprising a plurality of dual opposing cantilevered copper pads.

BRIEF DESCRIPTION OF THE DRAWINGS

The above and other aspects will become apparent and more readily appreciated from the following description of the exemplary embodiments, taken in conjunction with the accompanying drawings of which.

DETAILED DESCRIPTION

Reference will now be made in detail to the exemplary embodiments, examples of which are illustrated in the accompanying drawings, wherein like reference numerals refer to like elements throughout. The aforementioned accompanying drawings show by way of illustration, and not by way of limitation, exemplary embodiments and exemplary implementations utilizing principles of the exemplary embodiments.

These implementations are described in sufficient detail to enable those skilled in the art to practice the exemplary embodiments and it is to be understood that other implementations may be utilized and that structural changes and/or substitutions of various elements may be made without departing from the scope and spirit of exemplary embodiments. The following detailed description is, therefore, not to be construed in a limited sense. Further, descriptions of like elements in the drawings will not be repeated for purposes of brevity.

Figures 6A, 6B:
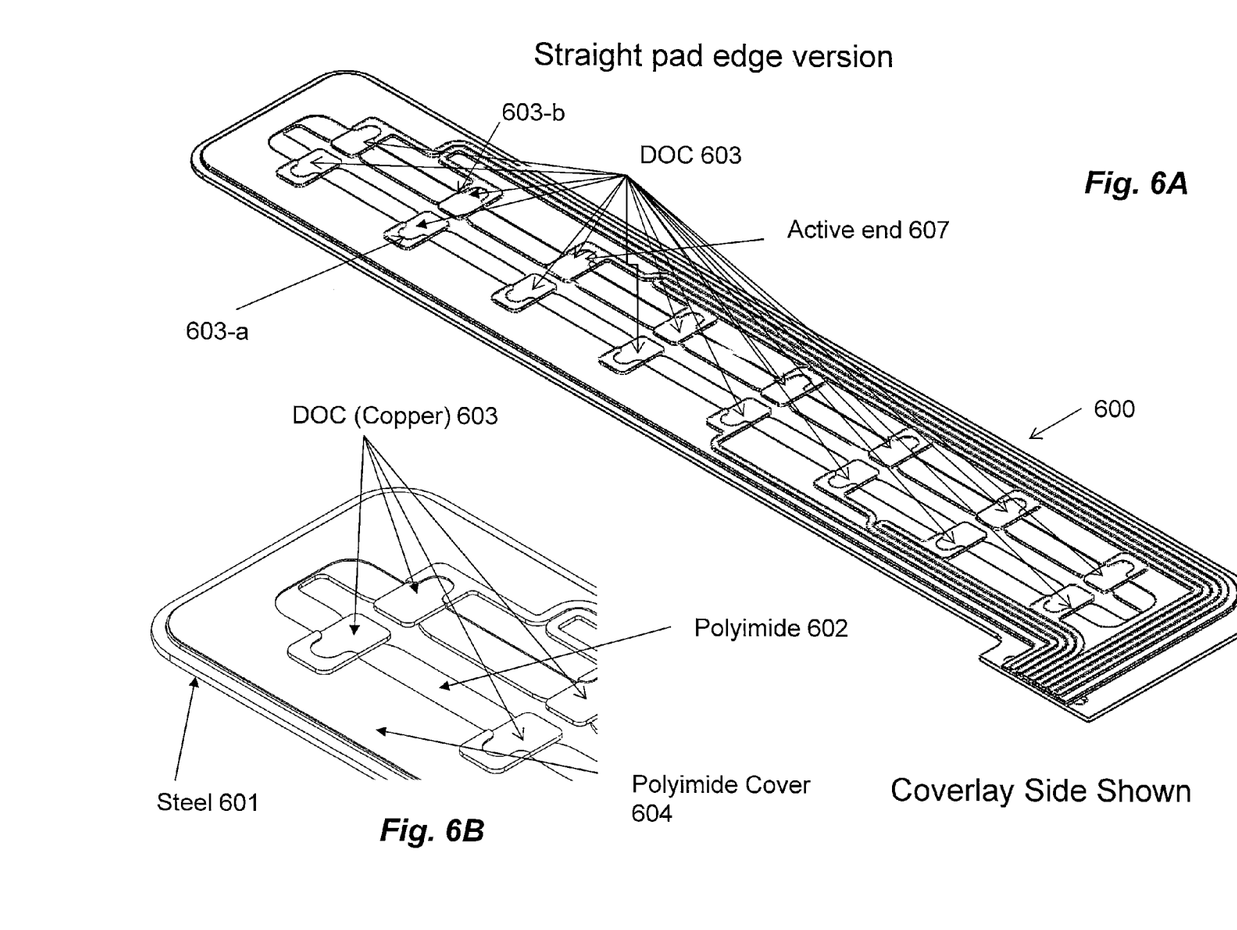
FIG. 6A illustrates a suspension flexure including dual opposing cantilevers (DOC) with a straight edge, in accordance with an exemplary embodiment.
FIG. 6B is a more detailed view of the dual opposing cantilevers with the straight edge on the suspension flexure.

FIG. 6A illustrates a suspension flexure including dual opposing cantilevers (DOC) with a straight edge, in accordance with an exemplary embodiment, FIG. 6B is a more detailed view of the dual opposing cantilevers with the straight edge on the suspension flexure, in accordance with an exemplary embodiment.

FIGS. 6A and 6B illustrate a coverlay side of the suspension flexure 600. As shown in FIG. 6B, a tail end of a suspension flexure 600 includes a steel layer 601, a polyimide layer 602 above the steel layer, copper pads 603, and a polyimide cover 604. The steel layer 601 acts as a base layer. The unsupported span of copper, which is for example, supported only on both ends by polyimide or polyimide and steel but left free and unsupported in the center of the pad is also called a flying lead. Although a single copper layer is shown, a plurality of copper layers can be used and can be separated from each other with a layer of polyimide.

The copper pads 603 are called dual opposing cantilevers (DOC) and include two smaller cantilevered copper pads 603-a and 603-b, as shown in FIG. 6A, which face each other and are in close proximity on the tail end of the suspension flexure. One DOC is described in the exemplary embodiments, however, there are a plurality of dual opposing cantilevers along the suspension flexure in the exemplary embodiments. The cantilevered copper pads 603-a and 603-b are cantilevered since they are fixed at one end and do not extend the entire length across from one longitudinal side of the suspension flexure 600 to another side of the suspension flexure 600. A cantilevered pad is a copper feature that is supported only on one end. That is, the cantilevered pad is free (i.e. unsupported) on the opposite end and on the two sides for the length of the pad.

There is a gap between the cantilevered copper pads 603-a and 603-b through which a conductive material, such as solder or conductive paste, can be applied in order to connect the suspension flexure 600 to the conductive surfaces of a flex circuit. Solder may be deposited in various ways, including solder jet and solder paste. Solder jet is when a volume of molten solder is ejected onto the conductive surfaces. Solder paste is when a volume of uncured liquid adhesive containing electrically conductive particles are dispensed in between the gap of the copper pads. This conductive paste is then dried and cured to harden it. These are merely examples and various methods of performing solder jet and solder paste would be clear to those of skill in the art. Aside from applying molten solder or conductive paste through the gap in the copper pad as described above, connectivity between the suspension flexure and flex circuit can also be accomplished in other ways including, for example, using a hot bar to heat steel features beneath the copper pads which will melt solder which has been pre-applied to either the suspension flexure or flex circuit, or by adding a sheet of anisotropic conductive film (ACF) between the pads of the suspension flexure and flex circuit.

Although the copper pads 603 are shown on a portion which does not include an active end 607, dual opposing copper pads 603 may not be necessarily located on the portion of the suspension flexure 600 which does not include an active end 607. Of the pair of opposing cantilevered pads, the active end is the electrically functional pad. That is, it connects the tail pads with other features in the suspension circuit, such as pads in the head of the flexure, a grounding point (i.e. connection to the steel layer) or other feature which requires electrical connection. For example, a single cantilevered copper pad can be used in an area of the suspension flexure when an opposing side of the single cantilevered copper pad does not have an active end.

As shown in FIG. 6A, the cantilevered copper pads 603-a and 603-b face each other and include a straight edge. Although a straight edge is shown in the exemplary embodiments, this is merely an example and various modifications can be made to the copper pads, as further discussed below. By using a straight edge, the cantilevered copper pads 603-a and 603-b and the suspension flexure can be easier to manufacture.

Further, as shown in FIGS. 6A and 6B, the polyimide cover 604 can be made to include a notch. However, this is merely an example and the polyimide cover 604 can, for example, be straight or wavy.

Figures 7A, 7B:
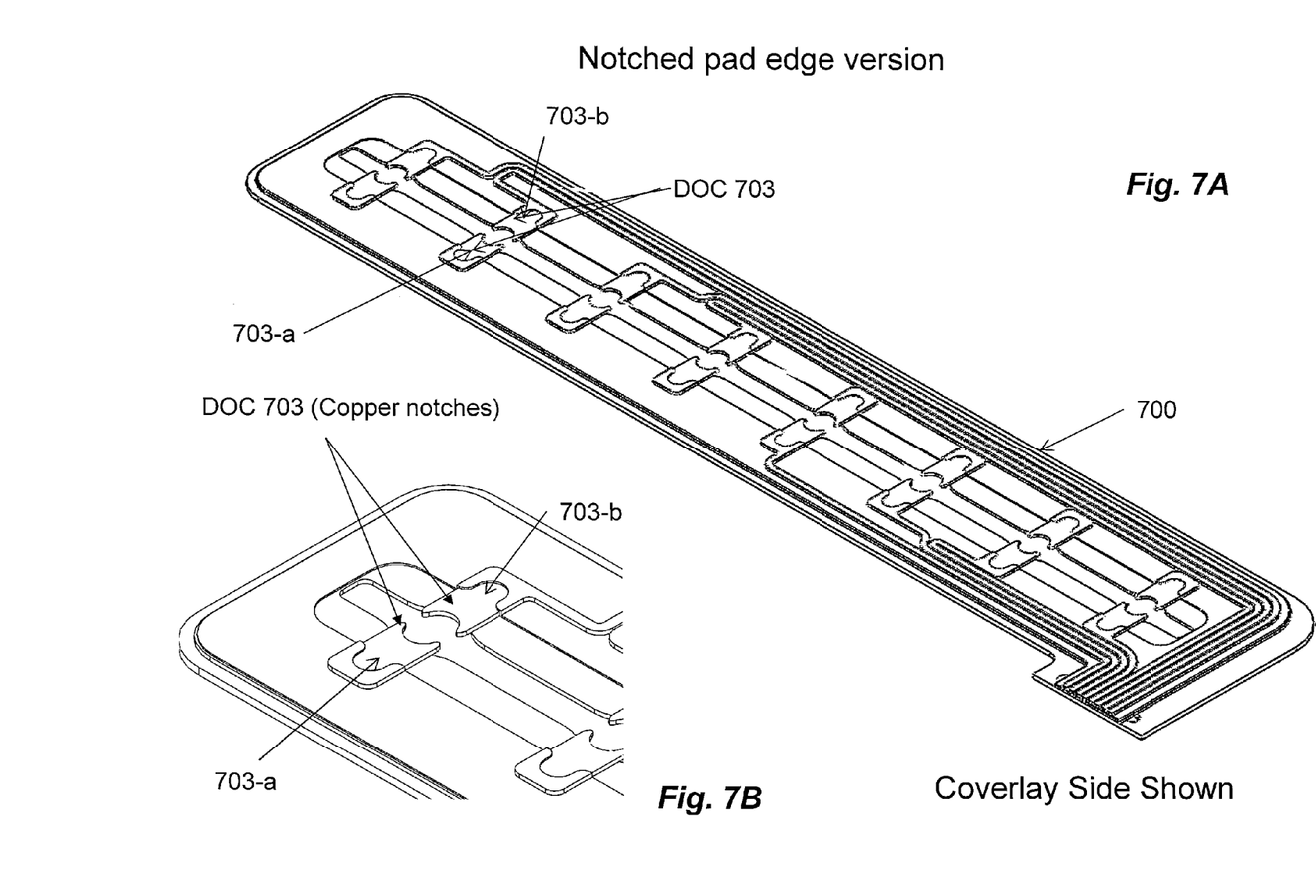
FIG. 7A illustrates a suspension flexure including dual opposing cantilevers with a notched edge, in accordance with an exemplary embodiment.
FIG. 7B illustrates a detailed view of the suspension flexure including dual opposing cantilevers with a notched edge, in accordance with an exemplary embodiment.

FIG. 7A illustrates a suspension flexure including dual opposing cantilevers with a notched edge, in accordance with an exemplary embodiment, and FIG. 7B illustrates a detailed view of the suspension flexure including dual opposing cantilevers with a notched edge, in accordance with an exemplary embodiment. As shown in FIG. 7A, the suspension flexure 700 includes dual opposing copper pads 703 which are made of copper and include two small cantilevered copper pads 703-*a* and 703-*b* which face each other. Further, the cantilevered copper pads 703-*a* and 703-*b* include a notched edge. FIG. 7B illustrates in more detail the cantilevered copper pads 703-*a* and 703-*b* including the notched edge.

Since there is a notch in the cantilevered copper pads 703-*a* and 703-*b*, there is a larger area through which a conductive material, such as solder or conductive paste, can be applied in order to connect the suspension flexure 700 to the conductive surfaces of a flex circuit. Therefore, since the size of the gap between the copper pads is increased, there is improved access for joining the cantilevered copper pads 703-*a* and 703-*b* to a flex circuit.

Figures 8A, 8B:
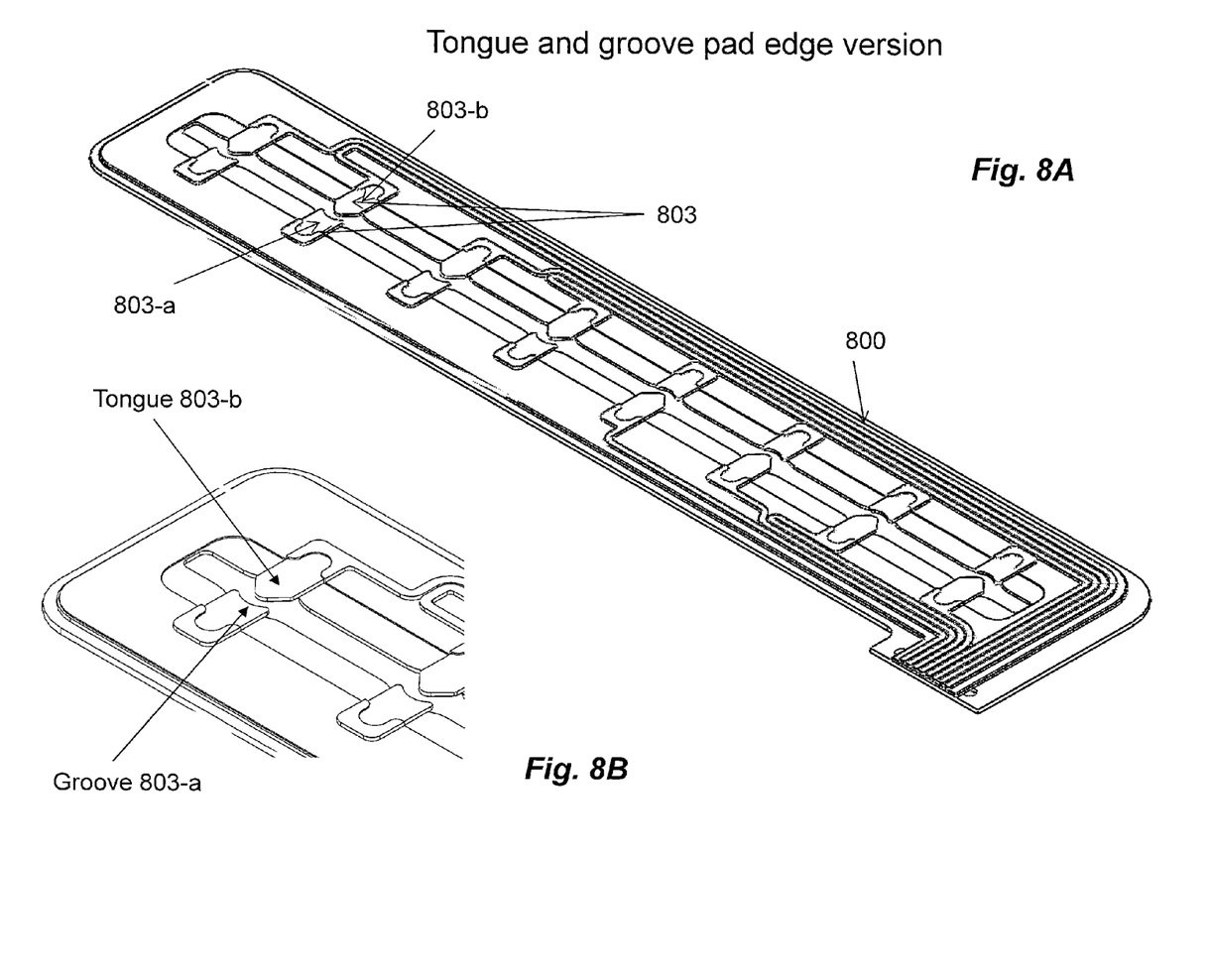
FIG. 8A illustrates a suspension flexure including dual opposing cantilevers with a tongue and groove edge, in accordance with an exemplary embodiment.
FIG. 8B illustrates a detailed view of the suspension flexure including dual opposing cantilevers with a tongue and groove edge, in accordance with an exemplary embodiment.

FIG. 8A illustrates a suspension flexure including dual opposing cantilevers with a tongue and groove edge, in accordance with an exemplary embodiment, and FIG. 8B illustrates a detailed view of the suspension flexure including dual opposing cantilevers with a tongue and groove edge, in accordance with an exemplary embodiment.

As shown in FIG. 8A, the suspension flexure 800 includes dual opposing copper pads 803 which are made of copper and include two small cantilevered copper pads 803-*a* and 803-*b* which face each other. Further, the cantilevered copper pads 803-*a* and 803-*b* have a tongue and groove edge. FIG. 8B illustrates the cantilevered copper pads 803-*a* and 803-*b* including the tongue and groove edge in more detail. In the example shown in FIGS. 8A and 8B, the cantilevered copper pad 803-*a* forms the groove portion of the tongue and groove edge and the cantilevered copper pad 803-*b* forms the tongue portion of the tongue and groove edge.

By using the tongue and groove edge, on the tongue edge (for example, cantilevered copper pad 803-*b*), the exposed conductive surface of the active pad is increased. The larger surface increases the area which contacts the added solder or conductive paste.

Figures 9A, 9B:
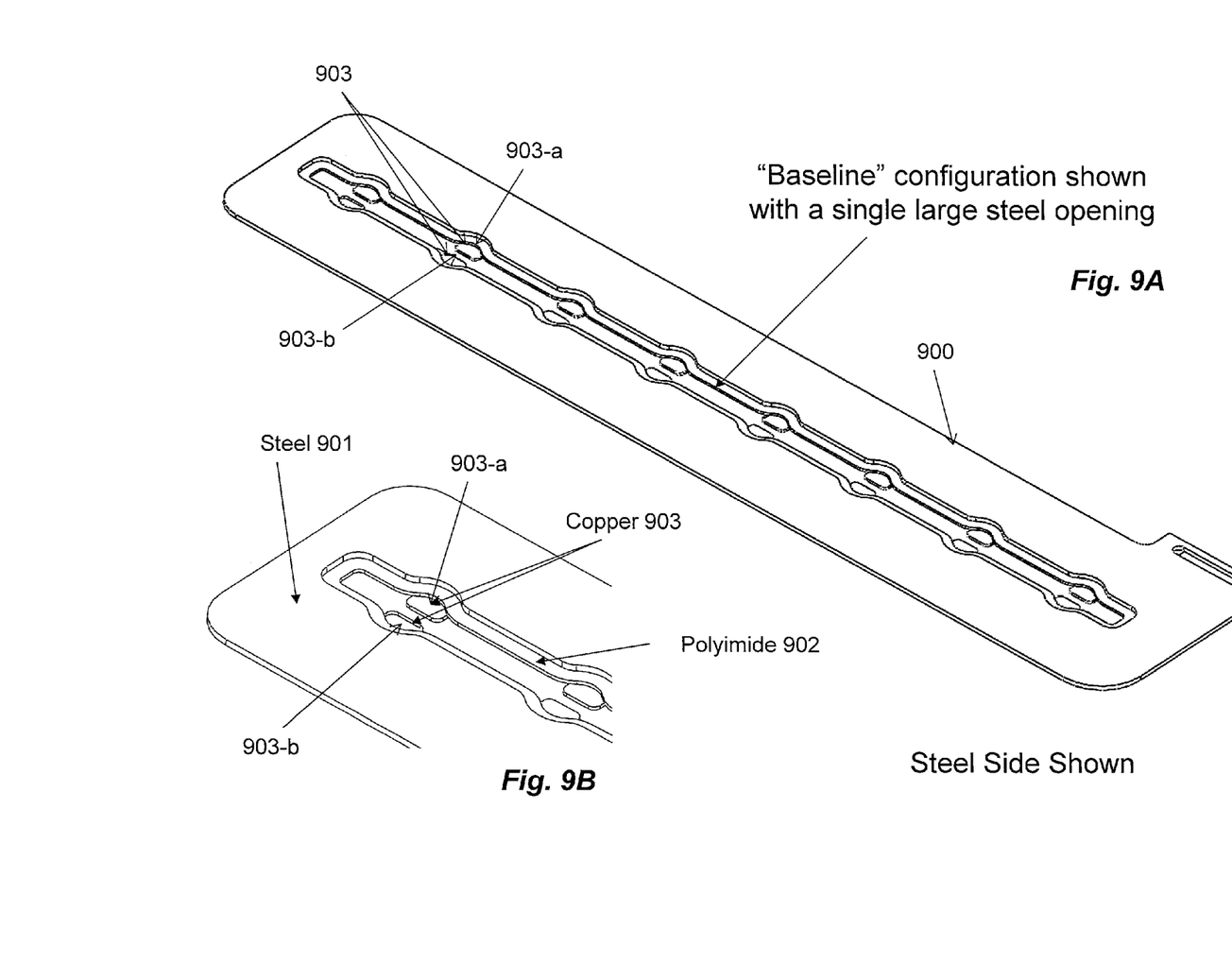
FIG. 9A illustrates a steel side view of the suspension flexure of FIG. 6B, in accordance with an exemplary embodiment.
FIG. 9B illustrates a more detailed view of the steel side view of the suspension flexure of FIG. 6B, in accordance with an exemplary embodiment.

FIG. 9A illustrates a steel side view of the suspension flexure of FIG. 6A, in accordance with an exemplary embodiment, and FIG. 9B illustrates a more detailed view of the steel side view of the suspension flexure of FIG. 6B, in accordance with an exemplary embodiment.

As shown in FIG. 9B, the steel layer 901 of the suspension flexure 900 appears on top in the drawing, followed by the polyimide layer 902, and the dual opposing copper pads 903. Although a polyimide cover exists in the suspension flexure shown in FIG. 9B, it is not visible from the steel side view. Further, the suspension flexure shown in FIGS. 9A and 9B can include cantilevered copper pads 903-*a* and 903-*b* which include a straight edge, but this is merely an example and different cantilevered copper pads can be used.

A conductive material, such as solder or conductive paste, can be applied from the steel layer side in order to connect the suspension flexure 900 to the conductive surfaces of a flex circuit. Although this is described with respect to FIG. 9, this is merely an example and the other exemplary embodiments can also apply a conductive material from the steel layer side of the suspension flexure.

Figure 10A:
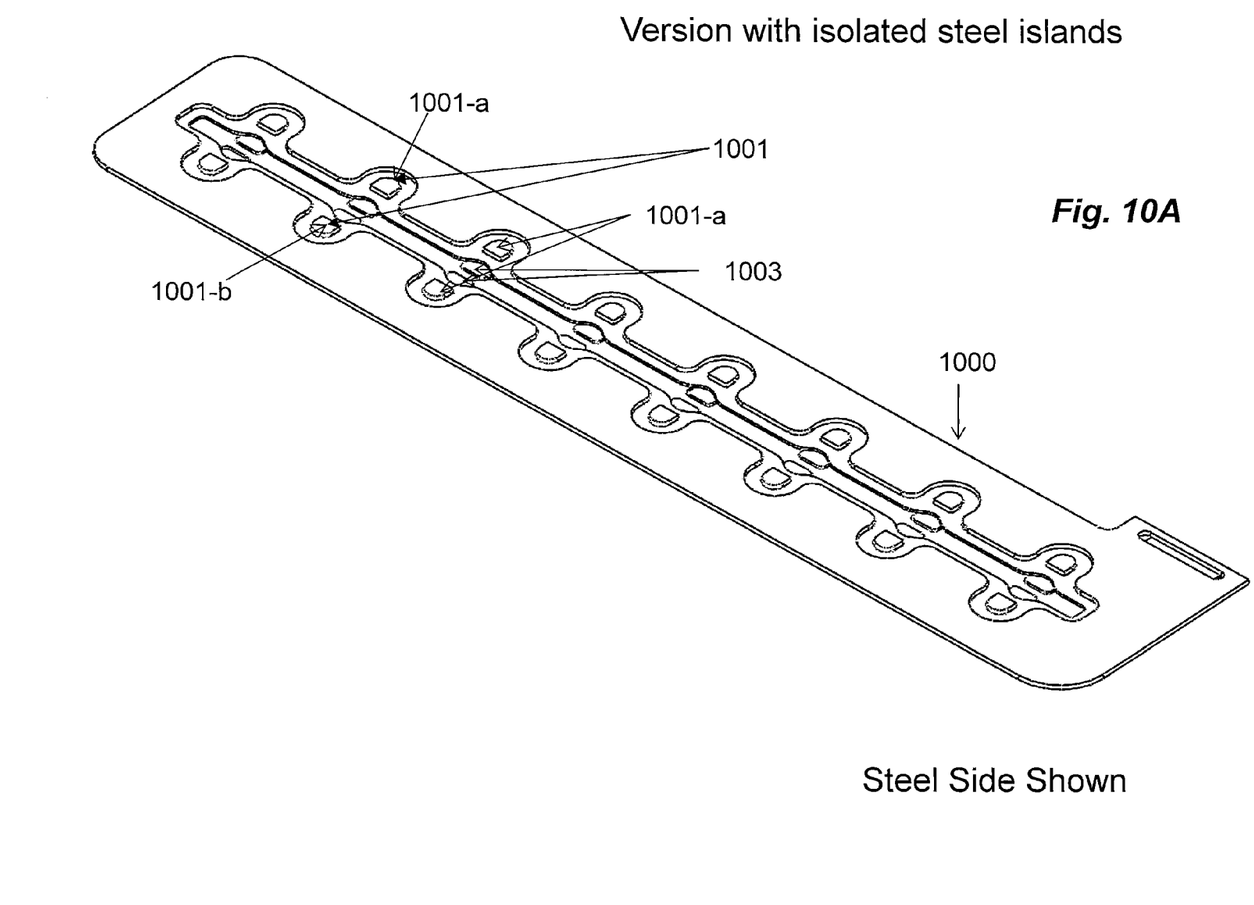
FIG. 10A illustrates a steel side view of the suspension flexure including isolated steel islands, in accordance with an exemplary embodiment.
Figure 10B:
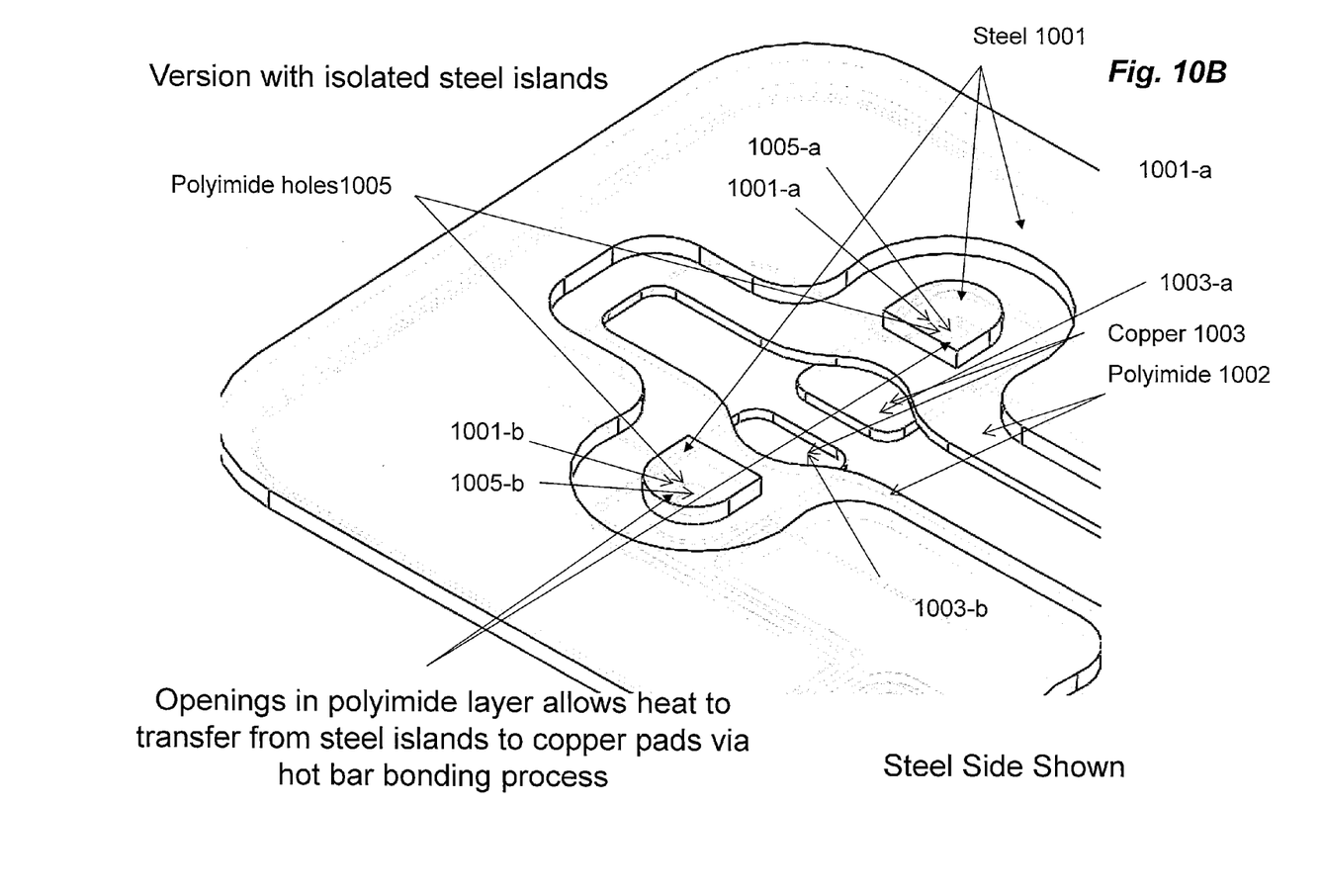
FIG. 10B illustrates a more detailed view of the steel side view of the suspension flexure including isolated steel islands, in accordance with an exemplary embodiment.

FIG. 10A illustrates a steel side view of the suspension flexure including isolated steel islands, in accordance with an exemplary embodiment, and FIG. 10B illustrates a more detailed view of the steel side view of the suspension flexure isolated steel islands, in accordance with an exemplary embodiment.

As shown in FIG. 10A, suspension flexure 1000 includes a steel layer 1001 which includes isolated steel islands 1001-*a* and 1001-*b*. As shown in FIG. 10B, by using isolated steel islands on the steel layer 1000, there are openings in the polyimide layer 1002 which allows heat to transfer from the steel islands 1001-*a* and 1001-*b* to the cantilevered copper pads 1003-*a* and 1003-*b*, respectively. The heat can be transferred from the steel islands 1001-*a* and 1001-*b* to the cantilevered copper pads 1003-*a* and 1003-*b*, respectively, via a hot bar bonding process.

The hot bar process uses a heated metal tool pressed onto a surface of one of the parts. For example, in an exemplary embodiment, the heated metal tool will press down and apply heat and pressure to the steel features in the suspension flexure. This will in turn transfer the heat from the steel features to the copper pads via, for example, an opening in the base polyimide layer which provides a direct path for the heat to flow between the steel and copper layers. This will then melt solder that has been applied in advance to one (or both) of the conductive surfaces of parts (in this case suspension flexure and flex circuit) to be joined.

FIG. 10A can be used for various different bonding methods including, for example, solder jet through the copper opening, solder paste through the copper opening, hot bar using the steel islands to aid in heat transfer to the pads and consequently to volumes of pre-applied solder or solder paste, and anisotropic conductive film (ACF) between the copper pads of the suspension flexure and the mating actuator flex circuit.

As shown in the dotted lines in FIG. 10B, circular holes 1005-*a* and 1005-*b* beneath the steel island 1001-*a* and 1001-*b*, respectively, represents holes in the polyimide layer. The circular polyimide holes 1005, which include circular holes 1005-*a* and 1005-*b*, are used during manufacturing as a plating bus for, for example, a gold plating process. Further, the circular polyimide holes 1005 function as a thermal pathway so that heat can be transferred from the steel to the copper when, for example, a hot bar is applied. A single set of circular polyimide holes 1005 is shown in FIG. 10B, however, a plurality of circular polyimide holes would be located throughout the suspension circuit.

Figures 11A, 11B:
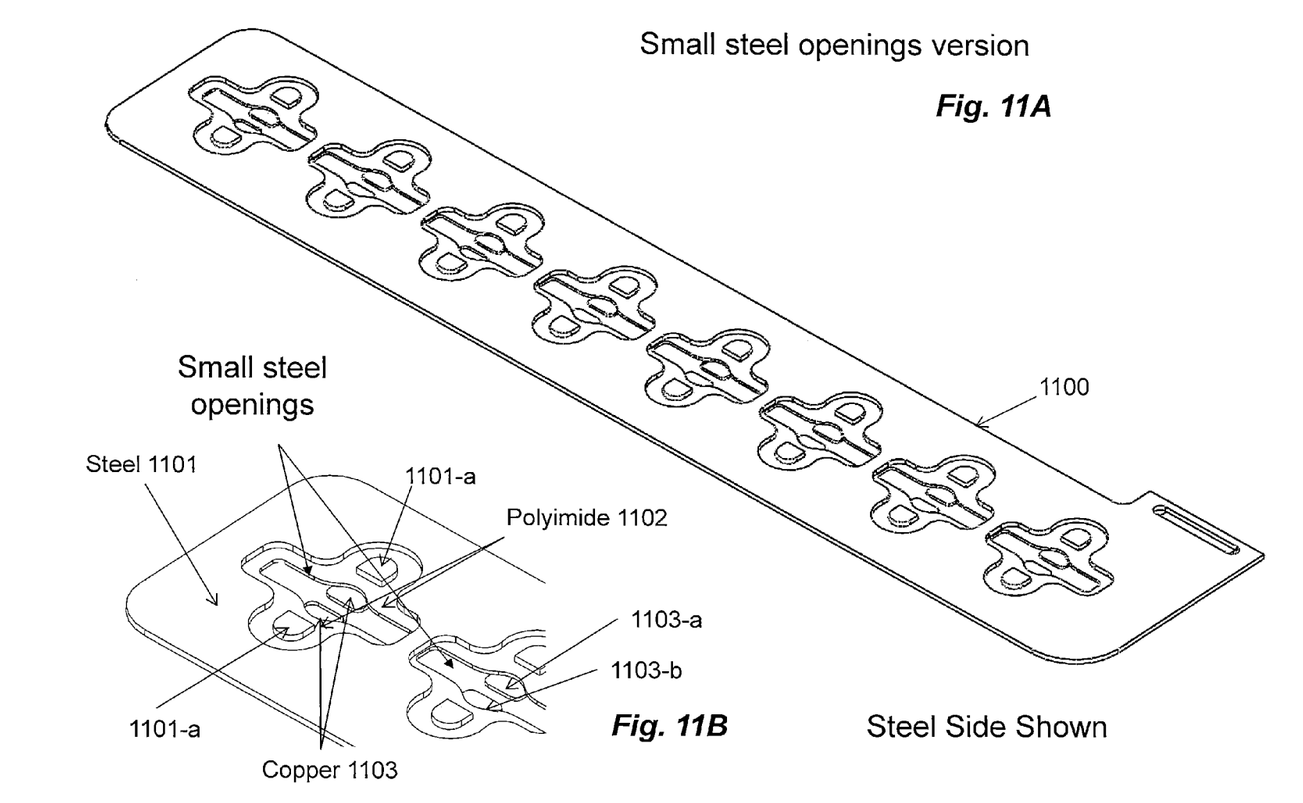
FIG. 11A illustrates a steel side view of the suspension flexure including isolated steel islands and steel openings, in accordance with an exemplary embodiment.
FIG. 11B illustrates a more detailed view of the steel side view of the suspension flexure isolated steel islands and steel openings, in accordance with an exemplary embodiment.
Figure 11C:
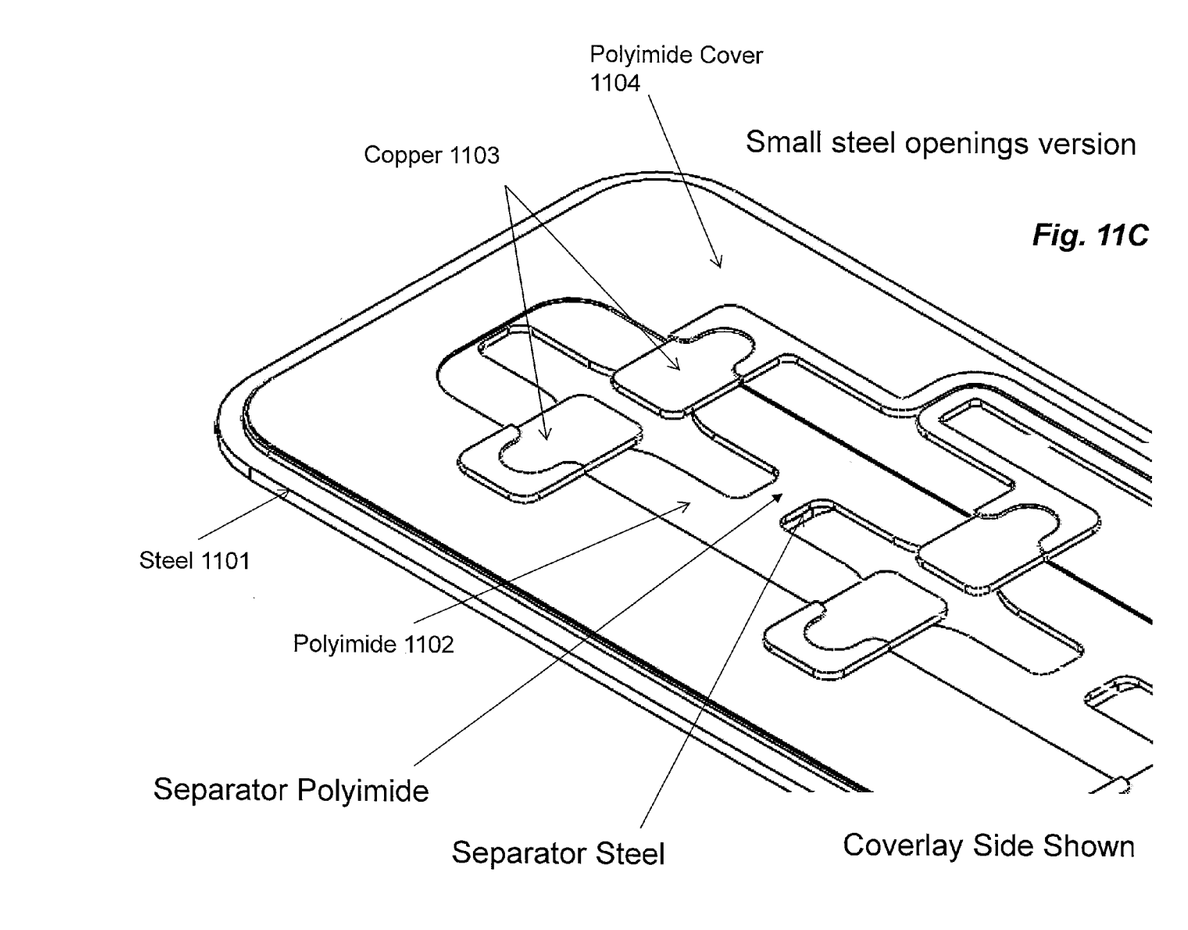
FIG. 11C illustrates a coverlay side of the suspension flexure including steel openings, in accordance with an exemplary embodiment.

FIG. 11A illustrates a steel side view of the suspension flexure including isolated steel islands and steel openings, in accordance with an exemplary embodiment, FIG. 11B illustrates a more detailed view of the steel side view of the suspension flexure including isolated steel islands and steel openings, in accordance with an exemplary embodiment, and FIG. 11C illustrates a coverlay side of the suspension flexure including steel openings, in accordance with an exemplary embodiment.

As shown in FIG. 11A, suspension flexure 1100 includes a steel layer 1001 which includes isolated steel islands 1001-*a* and 1001-*b*. As shown in FIG. 10B, by using isolated steel islands on the steel layer 1000, there are openings in the polyimide layer 1002 which allows heat to transfer from the steel islands 1001-*a* and 1001-*b* to the cantilevered copper pads 1003-*a* and 1003-*b*, respectively. The heat can be transferred from the steel islands 1001-*a* and 1001-*b* to the cantilevered copper pads 1003-*a* and 1003-*b*, respectively, via a hot bar bonding process.

FIG. 11C is the opposite side (i.e. coverlay side shown) of FIG. 11A. The small steel openings (as compared to a single large opening) may be more robust for ultrasonic washing, manufacturing handling etc.

Figures 12A, 12B:
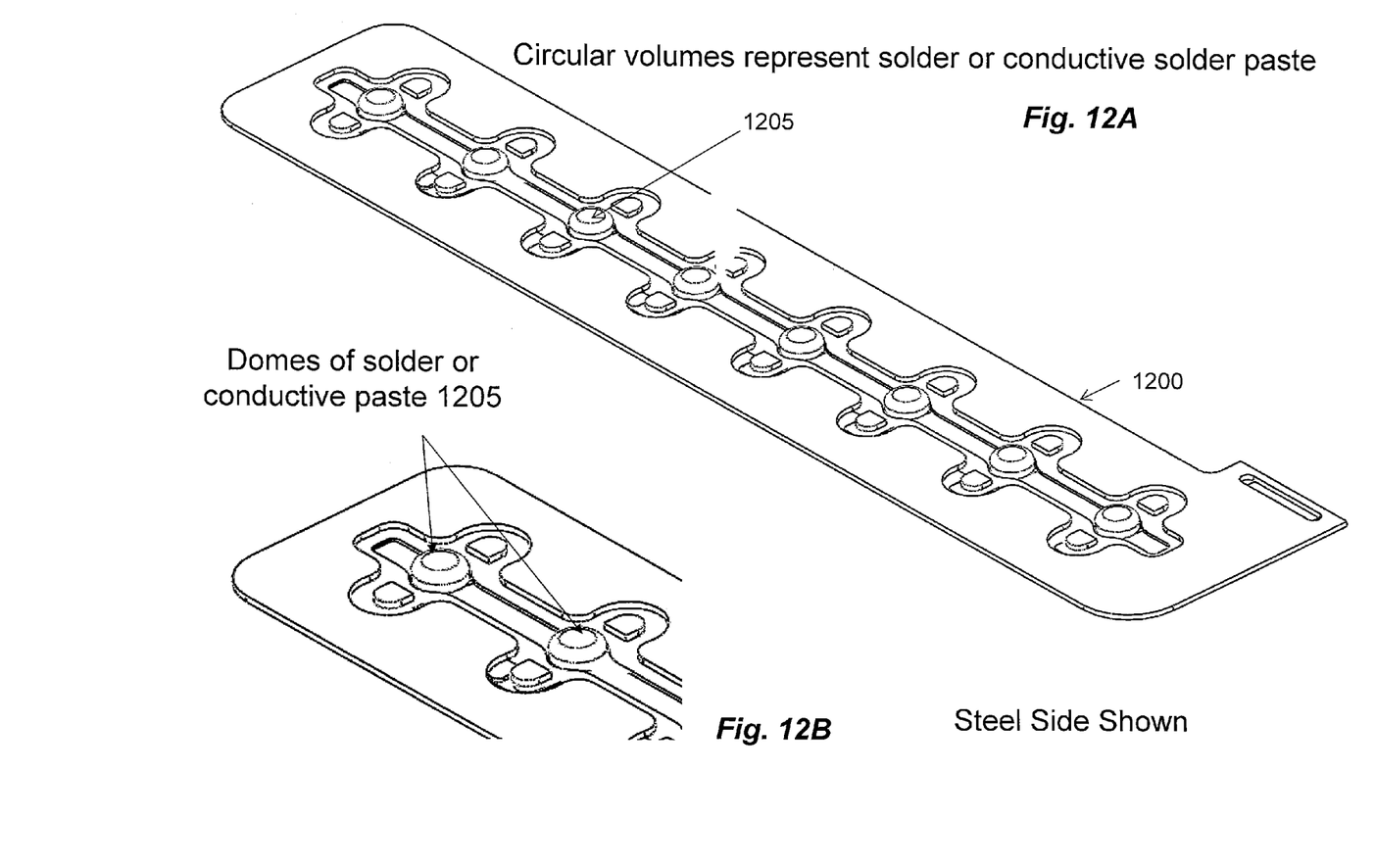
FIG. 12A illustrates a steel side view of the suspension flexure including isolated steel islands and solder, in accordance with an exemplary embodiment.
FIG. 12B illustrates a more detailed view of the steel side view of the suspension flexure including isolated steel islands and solder, in accordance with an exemplary embodiment.

FIG. 12A illustrates a steel side view of the suspension flexure including isolated steel islands and solder, in accordance with an exemplary embodiment, and FIG. 12B illustrates a more detailed view of the steel side view of the suspension flexure isolated steel islands and solder, in accordance with an exemplary embodiment.

As shown in FIG. 12A, suspension flexure 1200 includes domes of solder or conductive solder paste 1205. FIG. 12B is a more detailed view of the domes of solder or conductive solder paste 1205. Since there is a gap between the cantilevered copper pads a conductive material, such as solder or conductive paste, can be applied in order to connect the suspension flexure 1200 to the conductive surfaces of a flex circuit.

Various methods of bonding, such as hot-bar bonding, solder jet bonding, anisotropic conductive film (ACF) bonding, solder paste bonding, etc. can be performed while using the same tail design. Solder jet and solder paste bonding can be applied from the steel side and hot-bar bonding and ACF can be applied from the coverlay side.

Therefore, by using short cantilevered pads, the suspension flexure, suspension portion, or tail area is more robust for manufacturing and handling. Further, by using dual opposing cantilever pads, there is reduced strain on the copper pads which can prevent breakage. Further, the use of dual opposing cantilever pads can also ease the manufacturing and handling process.

By using small and short cantilevered copper pads, the copper pads would consequently take up less space and more copper pads for additional functions can be included in the suspension flexure. Flexures today contain, for example, a pair of writer pads, a pair of reader pads, a heater pad, a ground pad, a pair of pads attached to a sensor and optionally may also include one or two pads which are connected to a feature used in secondary actuation of the flexure, and in some cases an additional heater pad.

With the short cantilevered pad design, additional pads can be placed into existing space. Further, since the copper pads take up less space, the suspension flexure can be made smaller.

There is also greater flexibility during the assembly process since a single tail design can be used since the pads, according to the exemplary embodiments, can accommodate various bonding methods. A single tail design can be used regardless of the bonding method being used and a dedicated tail pad design is not required for each bonding method. For example, as shown in FIG. 12A, a hot bar method can be used by applying a heated element (bonding tool) to the isolated steel features to melt solder that has been previously applied to either the flex circuit or suspension flexure (or both). Alternately, molten solder can be ejected into the gap between the copper pads (solder jet bonding) or solder paste applied to the gap (solder paste method). Also, a sheet of ACF can be sandwiched between the copper pads of the suspension flexure and the copper pads of the flex circuit.

Also, it will be easier to align the suspension flexure with the flex circuit by using the openings between the pads. That is, the openings will allow for an easier visual check as to whether the suspension flexure and the flex circuit are aligned.

Other implementations of the exemplary embodiments will be apparent to those skilled in the art from consideration of the specification and practice of the exemplary embodiments disclosed herein. Various aspects and/or components of the described embodiments may be used singly or in any combination. It is intended that the specification and examples be considered as exemplary only, with a true scope and spirit of the exemplary embodiments being indicated by the following claims.

What is claimed is:

1. A suspension flexure comprising:
a steel layer;
a polyimide layer above the steel layer; and
a copper layer on the polyimide layer comprising a plurality of pairs of dual opposing cantilevered copper pads, wherein each pair of the plurality of pairs comprises a first copper pad and a second copper pad each having a free end portion and a fixed end portion,
the free end portions of the first copper pad and the second copper pad of each pair extend toward one another, and
the fixed end portions of the first copper pad and the second copper pad of each pair extend in directions opposing one another.

2. The suspension flexure according to claim 1, wherein the plurality of pairs of dual opposing cantilevered copper pads is disposed on a tail end portion of the suspension flexure.

3. The suspension flexure according to claim 1, wherein the steel layer of the suspension flexure comprises a single opening.

4. The suspension flexure according to claim 1, wherein the steel layer of the suspension flexure comprises a plurality of openings.

5. The suspension flexure according to claim 1, wherein a gap is formed between the free end portions of the first copper pad and the second copper pad extending toward one another, and the fixed end portions of the first copper pad and the second copper pad extend in the directions away from the gap.

6. The suspension flexure according to claim 1, wherein the fixed end portions of the first copper pad and the second copper pad are fixed to the suspension flexure.

7. A suspension flexure comprising:
a steel layer;
a polyimide layer above the steel layer; and
a copper layer on the polyimide layer comprising a plurality dual opposing cantilevered copper pads,
wherein the plurality of dual opposing cantilevered copper pads comprise a first cantilevered copper pad and a second cantilevered copper pad, wherein each of the first cantilevered copper pad and the second cantilevered copper pad has a straight edge.

8. A suspension flexure comprising:
a steel layer;
a polyimide layer above the steel layer; and
a copper layer on the polyimide layer comprising a plurality of dual opposing cantilevered copper pads,
wherein the plurality of dual opposing cantilevered copper pads comprise a first cantilevered copper pad and a second cantilevered copper pad, wherein each of the first cantilevered copper pad and the second cantilevered copper pad has a notch.

9. A suspension flexure comprising:
a steel layer;
a polyimide layer above the steel layer; and
a copper layer on the polyimide layer comprising a plurality of dual opposing cantilevered copper pads,
wherein the plurality of dual opposing cantilevered copper pads comprise a first cantilevered copper pad and a second cantilevered copper pad, wherein the first cantilevered copper pad and the second cantilevered copper pad form a tongue and groove pad edge.

10. A suspension flexure comprising:
a steel layer;
a polyimide layer above the steel layer; and
a copper layer on the polyimide layer comprising a plurality of dual opposing cantilevered copper pads,
wherein the steel layer of the suspension flexure comprises a plurality of steel islands.

11. The suspension flexure according to claim 10, wherein the polyimide layer comprises a plurality of holes under the plurality of steel islands, respectively, which transfer heat from the steel layer to the copper layer during bonding.

12. A suspension flexure comprising:
a steel layer;
a polyimide layer above the steel layer; and
a copper layer on the polyimide layer comprising a plurality of dual opposing cantilevered copper pads,
wherein the polyimide layer comprises a plurality of holes which transfer heat from the steel layer to the copper layer during bonding.

\* \* \* \* \*